UNITED STATES PATENT OFFICE.

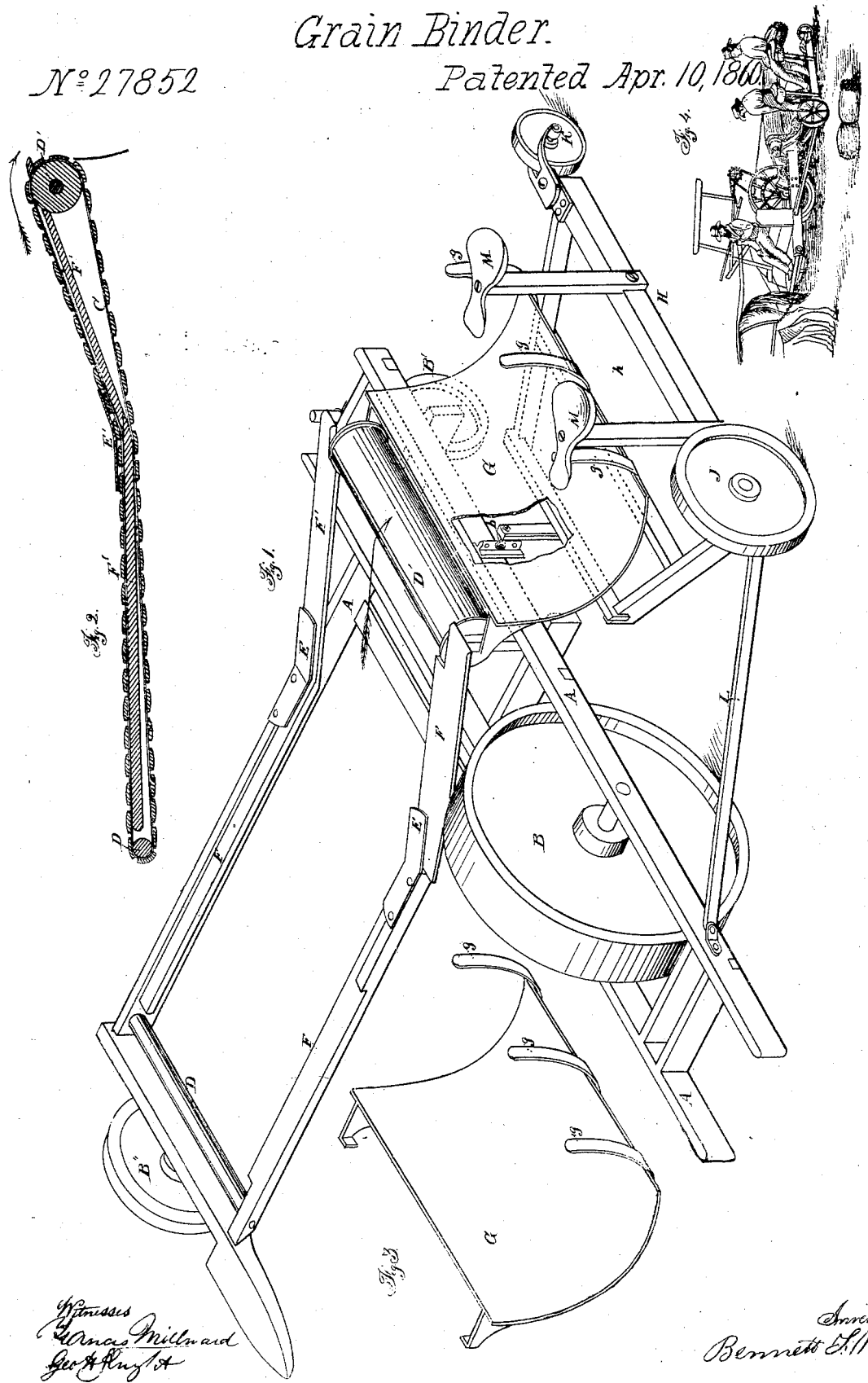

BENNETT F. WITT, OF DUBLIN, INDIANA.

IMPROVEMENT IN HARVESTING-MACHINES.

Specification forming part of Letters Patent No. 27,852, dated April 10, 1860.

REISSUED

*To all whom it may concern:*

Be it known that I, BENNETT F. WITT, of Dublin, Wayne county, Indiana, have invented a new and useful Improvement in Harvesters; and I do hereby declare the following to be a full, clear, and exact description thereof, reference being had to the accompanying drawings, making part of this specification.

The said invention consists in the construction and arrangement, hereinafter fully set forth, of a supplementary carriage coupled loosely to the side of a harvesting-machine for the purpose of carrying one or more binders, the said carriage being supported at one side upon its own wheels, so as to be adapted to accommodate itself to undulations in the surface of the ground and compensate for the side draft of the machine.

In the accompanying drawings, Figure 1 is a perspective view of a portion of a machine provided with my attachment. Fig. 2 is a longitudinal section of the apron. Fig. 3 is a detached view of the cradle. Fig. 4 represents the apparatus in operation.

A is the frame of the machine, supported on wheels B B' B''.

C is an endless apron stretched and revolving (see arrows) around rollers D D', journaled in the frame. Sheaths E E', above the apron, and slats F F', between its upper and lower portions, and extending from roller to roller, hold the portion of the apron which is behind the cutters to a horizontal position and the other portion of the apron to an upwardly-inclined position. The apron C receives the grain as it falls, and, carrying it sidewise and upward over the roller D', delivers it with no material disturbance into a concave receiver or cradle, G, within which it is retained by fenders *g*, placed at such intervals apart as to permit the binders to easily reach and handle the grain.

To facilitate the labor of binding and at the same time to counteract side draft, I provide a carriage, H, having a platform, *h*, supported a short distance above the ground by means of wheels J K at its outer edge, its inner edge being supported by means of an adjustable hinge-coupling, *b*, to such part of the frame A as to bring the platform *h* in line with the delivery of the apron C. The carriage is further secured in the proper position in relation to the frame A by means of a brace, L, loosely shackled to the frame A and platform *h*, respectively, thus permitting the carriage H to adapt itself to inequalities of the ground. Saddle-formed seats M are so placed as to serve the purposes of support and stay to the binders.

Fig. 4 exhibits the manner in which the grain is delivered to the cradle, the positions of the binders, and the mode of operation.

Where the straw is light and of good length a single binder will suffice.

The invention is not limited in its combination to machines in which the endless apron C is employed, but may be applied to various descriptions of harvesters constructed to deliver grain at the side.

What I claim as my invention, and desire to secure by Letters Patent as an improvement in harvesting-machines, is—

The two-wheeled binders' carriage H, constructed, arranged, and connected in the manner described, with the reaping-machine adapted for side delivery, the parts operating in combination, substantially as and for the purposes specified.

In testimony of which invention I hereunto set my hand.

BENNETT F. WITT.

Witnesses:
GEO. H. KNIGHT,
FRANCIS MILLWARD.